(12) United States Patent  
Hutchison

(10) Patent No.: US 9,482,144 B2
(45) Date of Patent: Nov. 1, 2016

(54) AIR-ACTUATED FAN CLUTCH

(71) Applicant: BorgWarner Inc., Auburn Hills, MI (US)

(72) Inventor: Ronald Allen Hutchison, Portage, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/167,971

(22) Filed: Jan. 29, 2014

(65) Prior Publication Data

US 2015/0211586 A1   Jul. 30, 2015

(51) Int. Cl.
*F01P 7/08* (2006.01)
*F16D 25/0632* (2006.01)
*F16D 48/02* (2006.01)

(52) U.S. Cl.
CPC ........... *F01P 7/085* (2013.01); *F16D 25/0632* (2013.01); *F16D 2048/0233* (2013.01); *F16D 2048/0266* (2013.01)

(58) Field of Classification Search
None
See application file for complete search history.

(56) References Cited

U.S. PATENT DOCUMENTS

| 5,607,038 | A | * | 3/1997 | Lorriette | 192/85.01 |
| 5,902,344 | A | * | 5/1999 | Eike et al. | 701/67 |
| 5,984,070 | A | * | 11/1999 | Briggs et al. | 192/85.01 |
| 6,328,674 | B1 | * | 12/2001 | Matsue et al. | 477/155 |
| 6,868,809 | B1 | | 3/2005 | Robb | |
| 7,047,911 | B2 | | 5/2006 | Robb et al. | |
| 7,055,668 | B2 | | 6/2006 | Settineri | |
| 7,083,032 | B2 | | 8/2006 | Boyer | |
| 7,100,544 | B1 | | 9/2006 | Wayman | |
| RE39,765 | E | | 8/2007 | Robb | |
| 7,278,524 | B2 | | 10/2007 | Boyer | |
| 7,415,945 | B2 | | 8/2008 | Tuttle | |
| 7,430,956 | B2 | | 10/2008 | Clayton et al. | |
| 7,731,006 | B2 | | 6/2010 | Settineri | |
| 7,971,697 | B2 | * | 7/2011 | Kemmner et al. | 192/85.24 |
| 8,522,945 | B2 | | 9/2013 | Pickelman et al. | |
| 8,627,936 | B2 | | 1/2014 | Boyer | |
| 9,010,513 | B2 | | 4/2015 | Settineri et al. | |
| 2007/0023253 | A1 | * | 2/2007 | Wayman | 192/85 A |

* cited by examiner

*Primary Examiner* — Colby M Hansen
(74) *Attorney, Agent, or Firm* — Harness, Dickey & Pierce, P.L.C.; John A. Artz PC

(57) ABSTRACT

An air-actuated fan clutch having a translatable piston in communication with a pressure chamber and moveable between a piston neutral position and a piston activated position in response to air pressure. A clutch spring biases a clutch housing into engagement with a clutch element that is coupled for rotation with a drive shaft when the piston is in the piston neutral position. Movement of the piston to the piston activated position moves the clutch housing away from the clutch element to inhibit transmission of rotary power through the fan clutch. A valve and an actuator are provided to prevent movement of the piston from the piston neutral position when air pressure acting on the piston would be below a predetermined threshold.

17 Claims, 2 Drawing Sheets

AIR-ACTUATED FAN CLUTCH

TECHNICAL FIELD

The present invention relates generally to fan clutch assemblies and more particularly to methods and systems for improving the operation of airactuated cone clutch fan assemblies.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in temperature transmission.

It is not always desirable for such fan assemblies to be run continuously. At times, it is desirable for the temperature within the coolant to increase rather than decrease. Additionally, continuous operation when unnecessary places an non-required draw on the engine and thereby reduces efficiency. To compensate for this, present fan assemblies utilize fan clutch assemblies that allow for the selective engagement of the fan to the engine such that the fans are engaged only when necessary. The fan clutch assemblies may be operated in a plurality of configurations including hydraulic and air-pressure actuated. It is common for these systems to be biased towards fan operation such that when failure occurs in the clutch assembly, the fan continuously operates to keep the engine cool.

Airactuated friction clutch assemblies of this type which work well for their intended purpose are found in U.S. Pat. Nos. 7,731,006, 7,055,668, and 7,430,956.

An issue with airactuated fan clutch assemblies relates to situations where the air pressure is too low to adequately cause actuation of the fan drive. This could result, for example, from a leak in the air supply, or a drain of pressure due to constant repeated usage. Without sufficient pneumatic pressure, the friction clutch might not engage solidly causing possible overheating and damage to the friction assembly and clutch.

It would therefore be desirable to have pneumatic clutch fan assembly with a system for protecting the fan assembly by preventing engagement of the friction clutch when a low pressure situation exists.

It would also be desirable to provide a clutch assembly with a pneumatic control mechanism that would prevent slip damage due to low, external operating air pressure.

It would further be desirable for such a clutch assembly to provide optimal performance and operation at all times during operation.

SUMMARY OF THE INVENTION

In one form, the present teachings provide an air-actuated fan clutch that includes a drive shaft, a clutch element, a friction liner, a clutch housing, a clutch spring, a piston, a first directional valve and an actuator. The drive shaft is rotatable about an axis. The clutch element is coupled to the drive shaft for rotation therewith. The friction liner is disposed about the clutch element. The clutch housing is rotatable relative to the drive shaft about the axis and is movable relative to the clutch element along the axis between a first position, in which the clutch element, the friction liner and the clutch housing cooperate to permit transmission of rotary power between the clutch element and the clutch housing, and a second position in which transmission of rotary power between the clutch element and the clutch housing is inhibited. The clutch spring biases the clutch housing toward the first position. The piston is movable along the axis between a piston neutral position and a piston activated position. Movement of the piston from the piston neutral position to the piston activated position causes corresponding movement of the clutch housing into the second position. Movement of the piston from the piston activated position to the piston neutral position causes corresponding movement of the clutch housing into the first position. The first directional valve has a first port, a second port and a first valve element. The first port is configured to be coupled to a source of fluid pressure. The second port is coupled in fluid communication with the piston. The first valve element is movable between a first element position, in which the first and second ports are not in fluid communication with one another, and a second element position in which the first and second ports are in communication with one another. The actuator is coupled to the first directional valve and configured to be coupled to the source of fluid pressure. The actuator provides at least one output that is configured to move the valve element of the first directional valve. The at least one output is at least partly based on a magnitude of a fluid pressure acting on the actuator and is produced when the magnitude is greater than or equal to a predetermined fluid pressure.

In another form, the present teachings provide a method of operating an air-actuated fan clutch. The fan clutch includes a piston, a clutch housing, a clutch element and a clutch spring. The piston is movable under fluid pressure to cause corresponding relative movement between the clutch housing and the clutch element such that rotary power is transmit-able between the clutch element and the clutch housing. The clutch spring biases the clutch housing away from the clutch element. The method includes: providing a first directional valve having a first valve element that is movable between a closed position and an open position, the first valve element being biased into the closed position; providing fluid pressure to a first directional valve while the first valve element is in the closed position; and moving the first valve element from the closed position to the open position to transmit fluid pressure to the piston to disengage the fan clutch in response to determining that a magnitude of the fluid pressure is greater than or equal to a predetermined value.

Other objects and features of the present invention will become apparent when viewed in light of the detailed description and preferred embodiment when taken in conjunction with the attached drawings and claims.

DESCRIPTION OF PREFERRED EMBODIMENTS

While the present invention is described primarily with respect to a system for a pneumatically controlled fan drive system, the present invention may be adapted and applied to various systems including: hydraulic systems, pneudraulic systems, mechanical systems, pneumatic systems, vehicle systems, cooling systems, fan drive systems, friction drive systems, or other systems.

In the following description, various operating parameters and components are described for preferred embodiments. These specific parameters and components are included only by way of example and are not meant to be limiting the invention to the described embodiment or systems having its particular structure or operational parameters.

Also, in the following description, various fan drive components and assemblies are described as an illustrative example. The fan drive components and assemblies may be modified depending upon the application.

Although the present invention may be used advantageously in various configurations and applications, it is especially advantageous in a coupling device of the type used to drive a radiator cooling fan of an internal combustion engine for an over-the-road truck.

Figure 1:
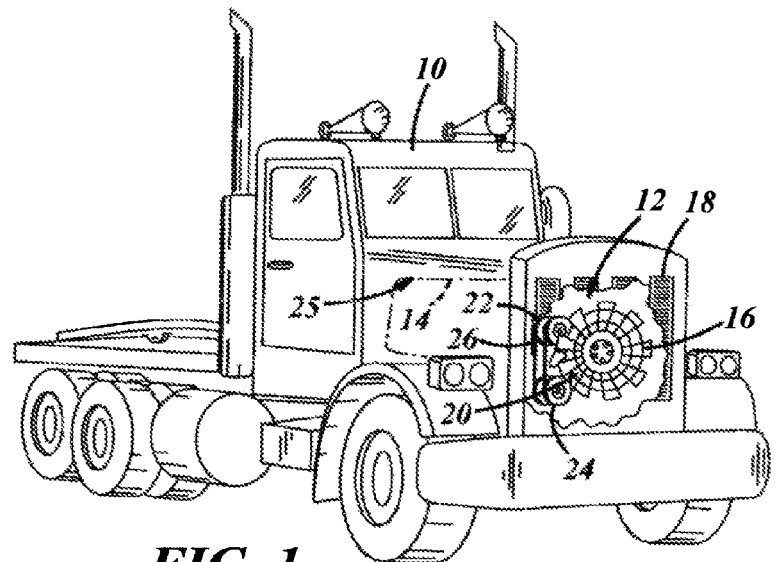
FIG. 1 is a perspective view of a representative vehicle utilizing a fluidically controlled fan drive system.

Referring now to FIG. 1, a perspective view of a representative vehicle 10 utilizing a representative fluidically controlled fan drive system 12 which can incorporate an embodiment of the present invention. The system 12 uses rotational energy from a liquid cooled engine 14 at an increased ratio to turn a radiator cooling fan 16 to provide airflow through a radiator 18. The system 12 includes a friction clutch assembly 20 that is fixed to one or more pulleys, such as pulley 22, which is coupled to and rotates relative to a crankshaft (not shown) of the engine 14. The pulleys rotate via a pair of belts 24, within an engine compartment 25. Of course, the present invention may be relatively operative in relation to various components and via any number of belts or other coupling devices, such as a timing chain. The friction clutch assembly 20 is mounted on the engine 14 via a mounting bracket 26. The friction clutch assembly 20 pneumatically engages the fan 16 during desired cooling intervals to reduce the temperature of the engine 14.

The fan 16 may be attached to the friction clutch assembly 20 by any suitable means, such as is generally well known in the art. It should be understood, however, that the use of the present invention is not limited to any particular configuration of the system 12, or fan mounting arrangement, or any particular application for the system 12.

Figure 2:
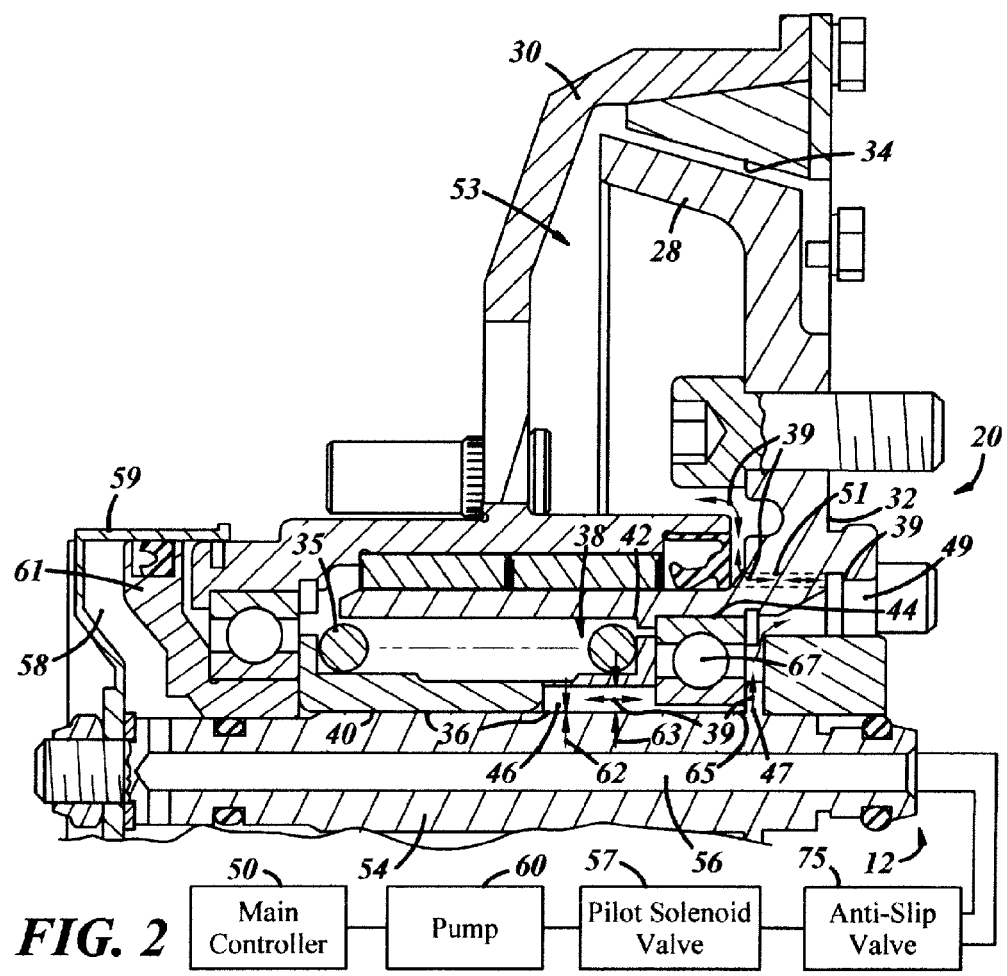
FIG. 2 depicts a quarter side cross-sectional view of a friction cone clutch assembly.

Referring now to FIG. 2, a quarter side cross-sectional view of the friction clutch assembly 20 is shown. The assembly 20 includes a translatable clutch housing 30 and a rotating shaft 32. The clutch housing 30 is attached to an engine cooling fan, such as fan 16. The rotating shaft 32 is coupled to a drive pulley, such as pulley 22. A friction liner 34 is coupled to the clutch housing 30 and resides between the clutch housing 30 and the rotating shaft 32. A clutch spring 35 engages the clutch housing 30 with the rotating shaft 32. The clutch spring 35 resides on spring carriers or retainers 36, within a clutch spring area 38, and within the shaft 32.

In operation, air, as represented by arrows 39, is forced in and out of the spring area 38, through the passages 46 through a piston rod bearing groove 47, through a rear cavity 49, through a shaft channel 51, and into the housing cavity 53.

The friction clutch assembly 20 also includes a fluidic control circuit that is operated via a main controller 50. The fluidic control circuit includes a piston rod or pneumatic transfer conduit 54 with a fluid channel 56 residing therein for the transfer of fluid, such as air, into a piston reservoir 58 of an air cylinder 59. The air cylinder 59 resides over a piston 61. A fluid pump 60 and corresponding solenoid 57 are fluidically coupled to the fluid channel 56. The main controller 50 is coupled to the pump 60 and to the solenoid 57 and adjusts the flow of the fluid into and out of the reservoir 58. The solenoid may be replaced with other types of valves known in the art.

When air pressure is supplied, the reservoir 58 becomes pressurized and the clutch piston member 61 is moved into a piston activated position. In this position, the translatable clutch piston member 61 moves the clutch housing 30 relative to the cone clutch element 28 into a clutch disengaged position. (This position is shown in FIG. 2.) When in the clutch disengaged position, the clutch housing 30 is disengaged from the cone clutch element 28 and the rotating drive shaft 32 such that the clutch housing 30 is independently rotatable relative to the clutch element 28 and the rotating drive shaft 32.

The clutch spring member 35 is positioned within the clutch housing 30 and biases the clutch housing 30 relative to the cone clutch element 28 into a clutch engaged position. When pressure within the pressure chamber is released, the clutch spring 35 moves the clutch housing 30 relative to the cone clutch element 28 into the clutch engaged position and the translatable clutch piston 61 moves into the piston neutral position. The clutch spring 35 also provides a maximum spring force which in turn translates into a clutch engagement force between the clutch housing 30 and the cone clutch element 28. This force prevents slippage between the clutch housing 30 and the cone clutch element 28.

The main controller 50 may be contained within the system 12 or may be separate from the system 12 as shown. The main controller 50 may be microprocessor based, such as a computer having a central processing unit, memory (RAM and/or ROM), and associated input and output buses. The main controller 50 may also be a portion of a central vehicle main control unit, an interactive vehicle dynamics module, a cooling system controller, or may be a stand-alone controller as shown.

In operation, the friction clutch assembly 20 is frequently engaged. When engaged, no fluid is pumped into the reservoir 58. In such situations, the piston 61 is in the piston neutral position, the clutch housing 30 is in the clutch engaged position (relative to the clutch element 28) and the spring 35 is in an expanded state. When cooling is no longer desired, the main controller 50 pumps fluid into the reservoir 58, which causes the piston 61 to shift rearward, towards the shaft 32. As the piston 61 shifts rearward, the housing 30 also shifts rearward, thereby compressing the spring 35 and causing the friction liner 34 and thus the clutch housing 30 to disengage from the clutch element 28. As the spring 35 compresses, the volume of the spring retainer area 38 decreases, which forces air within the spring retainer area 38 to pass through the passages 46.

The present invention creates new airactuated controls that add the feature of preventing exposure to low air pressure that could allow slipping damage to the clutch during disengaged operation. For this purpose, an anti-slip valve mechanism 75 is provided.

Figure 3:
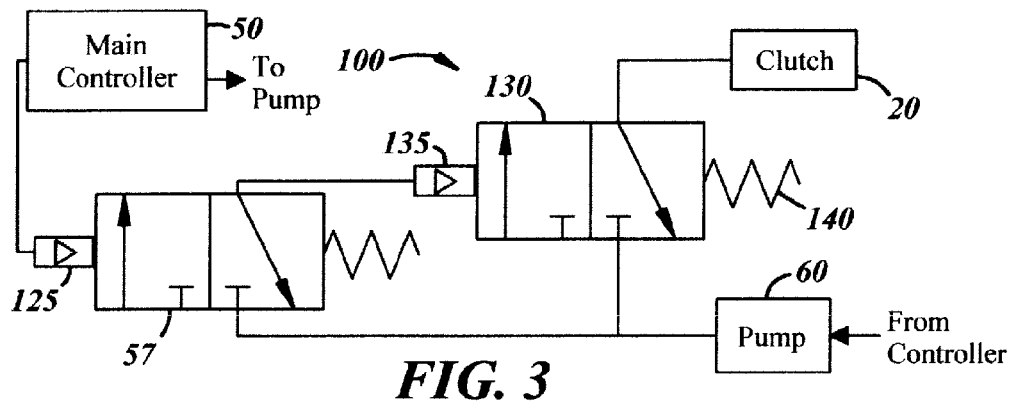
FIG. 3 depicts a preferred embodiment of an electro-pneumatic 3-way control system in accordance with the present invention.

A first embodiment of a system for preventing the friction clutch from slipping and from possibly becoming damaged if the pneumatic pressure in the vehicle is too low, is shown in FIG. 3. This system 100 is an electro-pneumatic system which is solenoid based with additive electrical and pneumatic pilot signals operating on a three-way valve biased by a spring. The valve is essentially an on-off valve and is calibrated such that it will not allow air to flow to the friction clutch mechanism until it exceeds a certain value.

In order to prevent burn out of the valve, i.e. overheating and damage, particularly at high differential speeds, the system 100 is calibrated to not allow the passage of air until the air pressure is at least 60 psi and preferably at least 80 psi.

From the compressor or air pump 60, the pressurized air flows to pilot valve 57. The main controller 50 is programmed with the logic for operating all of the various systems in the vehicle. In this instance, the electric solenoid pilot valve 125 is an on-off valve which only is actuated when the main controller 50 determines that cooling is not needed. When opened, air can pass through it to valve 130.

When the valve 57 is opened, the air flows to the second valve 130 which is operated by a pneumatic pilot 135. Valve 130 is only opened when the air pressure exceeds a certain critical value, such as, for example, 60 psi. The biasing force from spring member 140 prevents the valve 130 from operating until the pilot vehicle air pressure reaches the preset value.

Once the minimum air pressure is reached, the valve 130 is opened allowing the pneumatic pressure to flow to the friction clutch mechanism 20 and operate it as set forth above. As evident from FIG. 3, both valves 57 and 130 need to be energized in order to provide air pressure to flow to the clutch mechanism 20.

The main controller or "Electronic Control Unit" ("ECU") for the vehicle is coupled both to the solenoid valve 57 and the pump 60.

Figure 4:
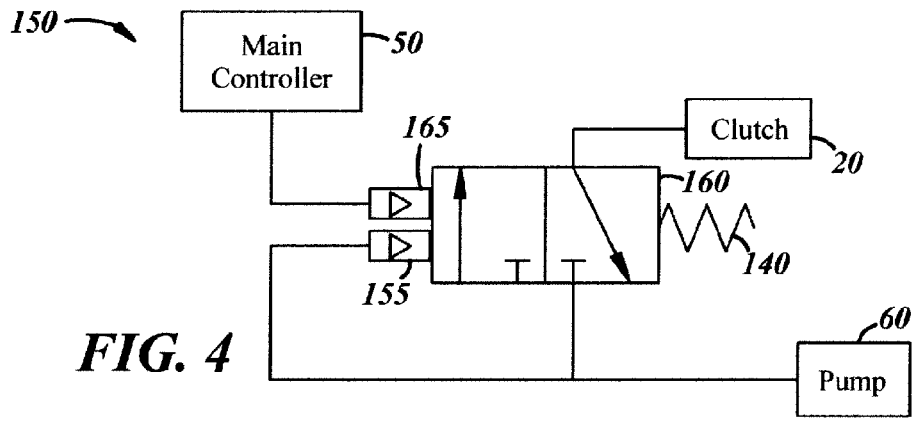
FIG. 4 depicts an alternate electronic pneumatic control system.

FIG. 4 depicts an alternate embodiment 150 of the invention. In this embodiment, air supplied from the compressor pump 60 flows to a pneumatic valve 155 which operates a pilot for the on-off valve 160. The ECU 50 controls the solenoid valve 165 which is an electric pilot. The valve 160 is biased by spring member 140. Both the electric pilot and pneumatic pilot signals are required to provide air pressure to flow to the clutch mechanism 20.

When the air pressure through pneumatic pilot valve 155 exceeds the minimum value, such as, for example, 60 psi, and the solenoid valve 165 is energized, the air pressure is allowed to flow to and operate the friction clutch assembly 20.

In FIG. 4, the electrical-pneumatic pilot solenoid valve in the vehicle is modified to add the air pilot feature. The connection of the air line to the valve pilot is internal to the valve. This addition insures that the friction clutch would not be subjected to air pressure at such a low pressure that it would result in slippage of the friction liner. In order for the valve to allow air pressure to the clutch, both the signal from the ECU and sufficient air pressure is needed.

The operation of the system to prevent damage to the friction liner can be carried out by types of valves other than electro-pneumatic valves. As shown in system 200 depicted in FIG. 5, a pressure switch 210 is utilized to prevent low pressure slippage in the friction clutch assembly.

The pressure switch 210 closes at the critical pressure level, such as 60 psi or 80 psi, and allows the electrical signal from the controller to pass through to valve 220 (or solenoid vale 230). The valve 220 is an on-off valve and opens to allow or pressure to flow to, and operate, friction clutch assembly 10. The valve 220 has a biasing spring 225 and an electrical solenoid valve 230.

Figure 5:
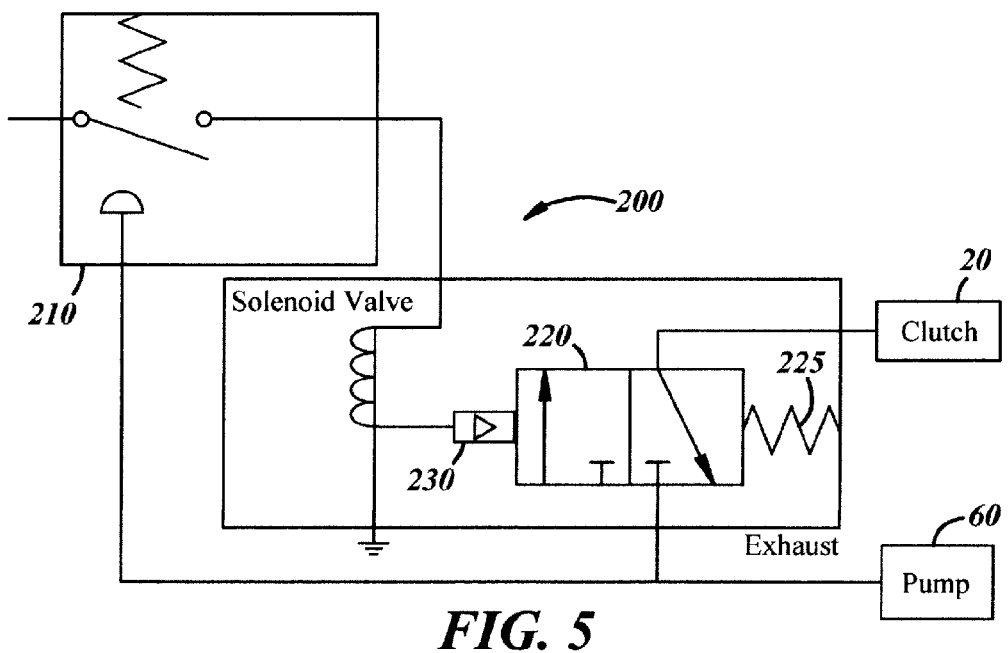
FIG. 5 depicts another alternate embodiment of the invention.

In FIG. 5, the pressure control switch is in series with the air control solenoid valve. The pressure switch 210 monitors the air pressure in the vehicle. This system 200 assures that the friction clutch 20 would not be subjected to a low air pressure that would result in liner slippage. In order for the valve 200 to allow any air pressure to the clutch, both the signal from the ECU and sufficient air pressure would be needed.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An air-actuated fan clutch comprising:
   a drive shaft that is rotatable about an axis;
   a clutch element that coupled to the drive shaft for rotation therewith;
   a friction liner disposed about the clutch element;
   a clutch housing that is rotatable relative to the drive shaft about the axis, the clutch housing being movable relative to the clutch element along the axis between a first position, in which the clutch element, the friction liner and the clutch housing cooperate to permit transmission of rotary power between the clutch element and the clutch housing, and a second position in which transmission of rotary power between the clutch element and the clutch housing is inhibited;
   a clutch spring that biases the clutch housing toward the first position;
   a piston that is movable along the axis between a piston neutral position and a piston activated position, wherein movement of the piston from the piston neutral position to the piston activated position causes corresponding movement of the clutch housing into the second position, and wherein movement of the piston from the piston activated position to the piston neutral position causes corresponding movement of the clutch housing into the first position;
   a first directional valve having a first port, a second port and a first valve element, the first port being adapted to be coupled to a source of fluid pressure, the second port being coupled in fluid communication with the piston, the first valve element being movable between a first element position, in which the first and second ports are not in fluid communication with one another, and a second element position in which the first and second ports are in communication with one another; and
   an actuator that is coupled to the first directional valve and configured to be coupled to the source of fluid pressure, the actuator providing at least one output that is configured to move the valve element of the first directional valve, the at least one output being at least partly based on a magnitude of a fluid pressure acting on the actuator, the magnitude being greater than or equal to a predetermined fluid pressure.

2. The air-actuated fan clutch of claim 1, wherein the actuator comprises pilot valve.

3. The air-actuated fan clutch of claim 2, wherein the actuator further comprises a second directional valve having an inlet port, an outlet port, which is coupled in fluid communication with the pilot valve, and a second valve element that is movable between a third element position, in which the inlet port and the outlet port are not in fluid communication, and a fourth element position in which the inlet port and the outlet port are in fluid communication.

4. The air-actuated fan clutch of claim 3, wherein the second directional valve comprises a solenoid, and wherein activation of the solenoid causes movement of the second valve element from the third element position to the fourth element position.

5. The air-actuated fan clutch of claim 3, wherein a valve spring biases the second valve element into the third element position.

6. The air-actuated fan clutch of claim 2, wherein the actuator further comprises a solenoid and wherein activation of the solenoid and operation of the pilot valve are both required to effect movement of the first valve element from the first element position to the second element position.

7. The air-actuated fan clutch of claim 1, wherein the actuator comprises a pressure switch and a solenoid, wherein the pressure switch is configured to output an activation signal to activate the solenoid when the fluid pressure is greater than or equal to a predetermined fluid pressure, and wherein activation of the solenoid causes movement of the first valve element from the first element position to the second element position.

8. The air-actuated fan clutch of claim 1, wherein a spring biases the first valve element into the first element position.

9. The air-actuated fan clutch of claim 1, wherein first mating surfaces on the clutch element and the friction liner are frusto-conically shaped.

10. The air-actuated fan clutch of claim 9, wherein second mating surfaces on the friction liner and the clutch housing are frusto-conically shaped.

11. The air-actuated fan clutch of claim 1, wherein mating surfaces on the friction liner and the clutch housing are frusto-conically shaped.

12. The air-actuated fan clutch of claim 1, wherein the magnitude of the predetermined fluid pressure is greater than or equal to 60 psig.

13. The air-actuated fan clutch of claim 12, wherein the magnitude of the predetermined fluid pressure is greater than or equal to 80 psig.

14. The air-actuated fan clutch of claim 1, wherein the first directional valve comprises a third port that communicates with the atmosphere and wherein the second port is coupled in fluid communication to the third port when the first valve element is in the first element position.

15. A method of operating an air-actuated fan clutch, the fan clutch comprising a piston, a clutch housing, a clutch element and a clutch spring, the piston being movable under fluid pressure to cause corresponding relative movement between the clutch housing and the clutch element such that rotary power is transmit-able between the clutch element and the clutch housing, the clutch spring biasing the clutch housing away from the clutch element, the method comprising:
  providing a first directional valve having a first valve element that is movable between a closed position and an open position, the first valve element being biased into the closed position;
  providing fluid pressure to a first directional valve while the first valve element is in the closed position; and
  moving the first valve element from the closed position to the open position to transmit fluid pressure to the piston to disengage the fan clutch in response to determining that a magnitude of the fluid pressure is greater than or equal to a predetermined value.

16. The method of claim 15, wherein the magnitude of the predetermined fluid pressure is greater than or equal to 60 psig.

17. The air-actuated fan clutch of claim 16, wherein the magnitude of the predetermined fluid pressure is greater than or equal to 80 psig.

* * * * *